Patented Aug. 24, 1948

2,447,822

UNITED STATES PATENT OFFICE 2,447,822

5-NITROTETRAHYDRO - 1,3 - OXAZINES AND METHOD FOR PREPARING THEM

Murray Senkus, Terre Haute, Ind., assignor to Commercial Solvents Corporation, Terre Haute, Ind., a corporation of Maryland No Drawing. Application February 25, 1946, Serial No. 650,134

12 Claims. (Cl. 260—244)

My invention relates to a new series of chemical compounds. More particularly it relates to 5-nitrotetrahydro-1,3-oxazines and to a process for the production thereof. The compounds of my invention may be represented by the following structural formula:

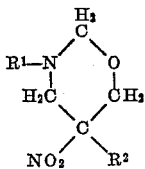

in which $R_1$ is a member of the group consisting of alkyl, aralkyl, cycloalkyl, 2-hydroxyalkyl, 3,5-dioxacyclohexyl, and 3,5-diazacyclohexyl and $R^2$ is a member of the group consisting of hydrogen, alkyl, aryl, aralkyl, and hydroxymethyl.

Typical examples of the 5-nitrotetrahydro-1,3-oxazines of my invention represented by the above formula include: 5-nitro-3-(1,3,5-trimethyl-3,5-diazacyclohexyl)-5-methyltetrahydro - 1,3 - oxazine, 5-nitro-5-methyl - 3 - cyclohexyltetrahydro-1,3-oxazine, 5-nitro-3-(1-methyl-3,5-dioxacyclohexyl)-5-methyltetrahydro-1,3-oxazine, 5-nitro-3,5-dimethyltetrahydro-1,3-oxazine, 5 - nitro-5-methyl-3-isopropyltetrahydro-1,3-oxazine, 5-nitro-5-isopropyl-3-benzyltetrahydro-1,3 - oxazine, 5-nitro-3-methyltetrahydro-1,3-oxazine, 5-nitro-3-methyl-5-(hydroxymethyl)tetrahydro-1,3-oxazine, 5-nitro-5-phenyl-3-isopropyltetrahydro-1,3-oxazine, 5-nitro-5-benzyl-3-butyltetrahydro-1,3-oxazine, and 5-nitro-5-propyl-3-(1-ethyl-2-hydroxyethyl)-tertahydro-1,3-oxazine.

According to my invention, the 5-nitrotetrahydro-1,3-oxazines of the types illustrated above may be readily prepared by reacting formaldehyde, an amine and a nitroparaffin. The order and conditions of the reaction may be varied considerably without materially affecting the course of the reaction. For example, the desired amine may first be reacted with aqueous formaldehyde to produce the N-(hydroxymethyl)-amine, the latter then being reacted with the nitroparaffin to give the 5-nitrotetrahydro-1,3-oxazine. If preferred, however, the three reactants may be mixed at the same time and the reaction permitted to take place. These and other modifications are illustrated in the specific examples cited below.

The exact mechanism whereby my new 5-nitrotetrahydro-1,3-oxazines are produced is not definitely known. It appears, however, that they may be produced by either of the following procedures, depending upon the starting materials employed.

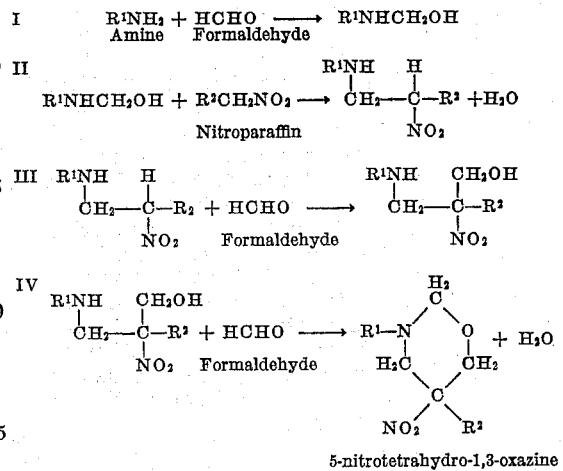

5-nitrotetrahydro-1,3-oxazine

As will be evident from the following equations the same result can be attained even though the reaction follows a somewhat different course.

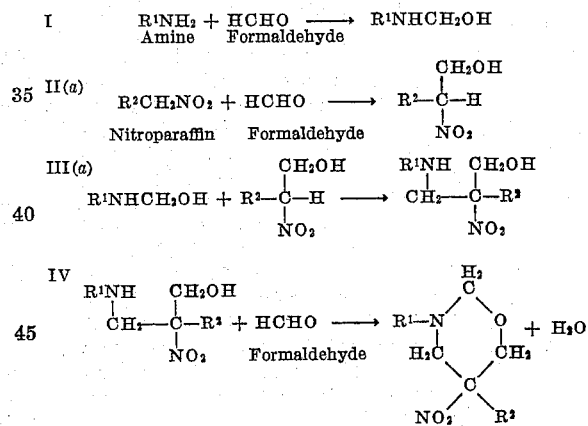

Using a nitroalkanediol in place of a nitroparaffin the reaction appears to take place as follows:

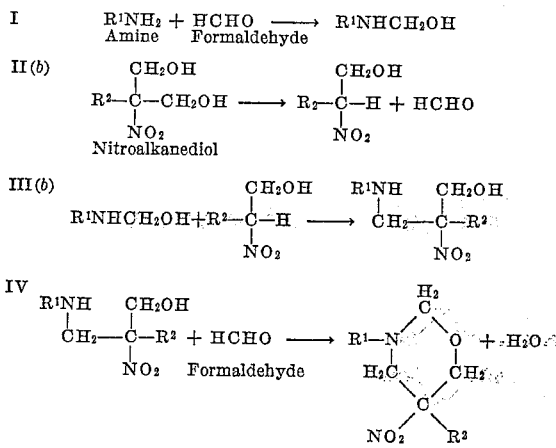

In all three of the suggested mechanisms the first and last steps are believed to be the same, whereas, the second and third steps may vary depending upon the method of procedure followed and whether a nitroparaffin or a nitroalkanediol is used. In the production of the N-(hydroxymethyl) amine in the first step, the formaldehyde is preferably first added to a cooled solution of the required amine in the ratio of three moles of the former to one of the latter. This reaction is generally quite exothermic in nature and it is usually desirable to cool the reaction vessel with ice or by other suitable means, particularly if volatile low molecular weight amines are employed. When the reaction has subsided, a suitable nitroparaffin having the nitro group attached to a primary carbon atom is added in a molar concentration equivalent to that of the amine. After all of the nitroparaffin has been introduced, the reaction mixture is generally heated to about 70° C. in order to drive the reaction to completion. The reaction, however, may be carried to completion without heating merely by permitting the reaction mixture to stand at room temperature for a number of hours, e. g., 10–15 hours. Upon completion of the reaction, the 5-nitrotetrahydro-1,3-oxazines are recovered by crystallization from a suitable solvent such as aliphatic or aromatic hydrocarbons, alcohols, or ethers, the choice of particular solvent depending to some extent upon the molecular weight of the 5-nitrotetrahydro-1,3-oxazines to be recovered and purified.

A modified and frequently preferred procedure for preparing the 5-nitrotetrahydro-1,3-oxazines of my invention involves mixing a nitroalkanediol with a suitable primary amine, the two materials being preferably brought together in a ratio of 1 mole of amine to one mole of nitroalkanediol. Under these conditions, the nitroalkanediol dissociates into the parent nitroparaffin and formaldehyde, thus resulting in the formation of the reaction mixture containing an amine, a nitroparaffin, and formaldehyde. In the case of aromatic amines a small quantity of catalyst, such as 50% aqueous sodium hydroxide, should be employed. Thereafter, formaldehyde in the form of an aqueous solution, or trioxymethylene, is added to the mixture in an amount corresponding approximately to the molecular quantity of nitroalkanediol present. Upon completion of the reaction the product is recovered as previously indicated.

Since the procedures described above result in the formation of identical products, and since they each fundamentally involve reaction mixtures containing formaldehyde, a primary amine, and a nitroparaffin having the nitro group attached to a primary carbon atom, it may be seen that the reactions occurring therein are in all essential respects equivalent. It is therefore to be specifically understood that the terminology employed in certain of the appended process claims is to be construed to cover both of the foregoing modifications.

While I have indicated above that it is desirable to use at least three moles of formaldehyde for each mole of nitroparaffin in the preparation of the compounds of my invention, it is possible to effect the desired reaction by employing lower proportions of formaldehyde, such as for example, two moles for each mole of nitroparaffin. The yields of 5-nitrotetrahydro-1,3-oxazines obtained, however, under such conditions are lower. The ratio of amine to nitroparaffin and formaldehyde may also be varied somewhat. It should be noted, however, that increasing the ratio of amine substantially above the proportions indicated above, namely one mole of amine to one mole of nitroparaffin to three moles of formaldehyde, results in an appreciable increase in the formation of 5-nitrohexahydropyrimidines, which are produced to some extent even with the ratios of reactants specified above and which are apparently primarily produced when the ratios of the reactants reach the proportions of one mole of nitroparaffin to two moles of amines to three moles of formaldehyde.

Reaction temperatures may be employed ranging from about 25–30° C. to a reflux temperature of the reaction mixture, the selection of temperature being dependent largely on the particular process utilized and the molecular weight of the primary amine employed. It may be mentioned, however, that reaction between substantially any amine and nitroparaffin may be effected at room temperature in the presence of formaldehyde if the reactants are permitted to remain in contact with one another for a sufficient period of time.

The reaction generally can be effected in the absence of a solvent. However, I have found it preferable in most instances to employ suitable solvents such as benzene or a lower aliphatic alcohol.

Any primary amine, aliphatic or aromatic, can be employed in my process and the structure of any particular amine utilized may vary widely. For instance, in addition to the utilization of any of the common aliphatic or aromatic amines such as methylamine, ethylamine, butylamine, cyclohexylamine, benzylamine, aniline, naphthylamine, 2-amino-1-butanol, and the like, I may also employ with equal success certain aromatic diamines, such as N-(2-aminoisobutyl)-N-methyl-o-chloroaniline, N-(2-aminoisobutyl)-N-methylaniline, N-(2-aminoisobutyl)-N-methyl-m-toluidine, N-(2-aminoisobutyl)-N-ethyl-p-aminobenzoic acid, and N-(2-aminoisobutyl)-N-methylsulfanilic acid; and aliphatic diamines, such as N-(2-aminoisobutyl)dimethylamine, N-(2-aminoisobutyl)isopropylmethylamine, N-(2-aminoisobutyl)-bis (1-methylhexyl)-amine, N-2-(aminoisobutyl) dioctadecylamine, N-(2-aminoisobutyl) benzylmethylamine, N-(2-aminoisobutyl)-N-(1-phenylethyl) methylamine, N-(2-aminoisobutyl) cyclohexylmethylamine, N-(2-aminoisobutyl)-N-(1-methylcyclohexyl)methylamine, 5-amino-3-benzyl-2,2,5-trimethyl-3-aza-1-hexanol, N-(2-aminoisobutyl)-bis(tetrahydrofurfuryl)amine, N-(2-aminoisobutyl)difurfurylamine, N-2-aminoisobutyl)piperidine, N-(2-aminoisobutyl)-2,5-dimethylpyrrolidine, N-(2-aminoisobutyl)morpholine, and the like.

I may also satisfactorily employ amino compounds such as 5-amino-5-methyl-1,3-dioxane and 5-aminohexahydropyrimidines of the type disclosed in my U. S. Patent No. 2,387,043, granted October 16, 1945.

The group of amines which I have designated as aromatic diamines may be conveniently prepared by catalytic reduction of the corresponding nitro amines under pressure, as described in copending application, U. S. Serial No. 571,955, filed January 8, 1945, by Harold G. Johnson. The nitro amines employed as starting materials for the synthesis of the aforesaid aromatic diamines may be prepared in accordance with the procedure described in copending application, Serial No. 571,954, filed January 8, 1945, by Harold G. Johnson. According to this procedure, a secondary aromatic amine is reacted with a suitable mono- or dihydric primary nitro alcohol in the presence of a basic catalyst, such as for example, sodium hydroxide, tributylamine, triethylamine, or benzylammonium hydroxide at a temperature of approximately 50° C.

The amines designated above as aliphatic diamines can readily be synthesized by cathalytically reducing the corresponding nitro amines under pressure in accordance with the procedure described and claimed in my copending applicaton, U. S. Serial No. 455,932, now Patent No. 2,393,825, filed August 24, 1942. The nitro amines utilized as starting materials may be synthesized in accordance with the procedure described in my copending applications, U. S. Serial Nos. 579,894, now Patent No. 2,419,506, 579,895, 579,896, 579,897, all filed February 26, 1945. By this procedure a secondary aliphatic amine is reacted with formaldehyde to form the corresponding N-hydroxymethyl mono- or di- alkylamine, which is in turn reacted with an equimolecular quantity of a secondary nitroparaffin to produce the desired nitro amine. The preparation of such nitro amines is preferably carried out at temperatures of from between about 25–30° C. Temperatures above this range may be utilized but in doing so care should be exercised to avoid temperatures which cause the formaldehyde to be volatilized from the reaction mixture.

As examples of suitable nitroparaffins which may be employed in my process, there may be mentioned nitromethane, nitroethane, 1- nitropropane, 1-nitrobutane, 1-nitroisobutane, 1-nitro-2-phenylethane, phenylnitromethane, and the like.

The process of my invention may be more specifically illustrated by the representative examples which follow:

*Example I*

To 117 g. of 5-amino-5-methyl-1,3-dioxane (1 mole) was added 225 ml. of 36% aqueous formaldehyde (3 moles). The temperature rose to 50° C. several minutes after the aldehyde had been added and then began to fall. To the mixture 75 g. of nitroethane (1 mole) was then added. The temperature of the mixture rose from 40° C. to 60° C. in thirty minutes. At this point it turned cloudy. The mixture was stirred for six hours and then was allowed to stand an additional six hours. The crystalline product which separated from the mixture was filtered, washed with 500 ml. of methanol and cooled to 0° C. The solid was recrystallized from 500 ml. of methanol, and dried in air for twenty-four hours; yield, 88 g. Analysis of the final product showed it to be a mixture of 5-nitro-3-(1-methyl-3,5-dioxacyclohexyl)-5-methyltetrahydro-1,3-oxazines and 5-nitro-1,3-bis(1-methyl-3,5-dioxacyclohexyl)-5-methylhexahydro-pyrimidine. Further crystallization from methanol gave the pure 5-nitrotetrahydro-1,3-oxazine.

*Example II*

To 270 g. of 2-nitro-2-methyl-1,3-propanediol (2 moles) was added 200 g. of 30% aqueous methylamine (2 moles). After the nitro glycol had dissolved, 160 ml. of 36% aqueous formaldehyde were added to the mixture and the solution was allowed to stand in the room for a week. The solution was extracted with one liter of ether and the ether extract was washed with two 500 ml. portions of water. The washed ether extract was heated on the steam bath in order to remove the ether. The residue weighed 130 g. and consisted primarily of 5-nitro-3,5-dimethyltetrahydro-1,3-oxazine.

*Example III*

To 59 g. of isopropylamine (1 mole) was added 75 ml. of 36% aqueous formaldehyde (1 mole). The mixture was cooled by external means during the addition of aldehyde. The non-aqueous layer was separated and was found to weigh 70 g. (0.79 mole of N-(hydroxymethyl)isopropylamine, assuming 100% purity). To this layer was added 105 g. of 2-nitro-2-methyl-1,3-propanediol (0.79 mole) and 500 ml. of benzene. The mixture was distilled slowly and the water from the reaction was removed. After water had ceased distilling, 500 ml. of petroleum ether was added to the residue and the solution was washed with three 500 ml. portions of water. Rectification of the washed solution gave 81 g. of 5-nitro-3-isopropyl-5-methyltetrahydro-1,3-oxazine, B. P. 83–85° C. at 0.3 ml.

The 5-nitrotetrahydro-1,3-oxazines of the type illustrated and discussed above are useful in the preparation of numerous valuable organic compounds. Additional uses of these materials will be apparent to those skilled in the art.

My invention now having been described, what I claim is:

1. A process for the preparation of 5-nitrotetrahydro-1,3-oxazines, which comprises bringing a primary amine into reaction with a nitroparaffin having a nitro group attached to a primary carbon atom, in the presence of formaldehyde, the latter being employed in a ratio of at least two moles to one mole of nitroparaffin and one mole of primary amine, and separating and recovering the 5-nitrotetrahydro-1,3-oxazines thus formed.

2. A process for the preparation of 5-nitrotetrahydro-1,3-oxazines, which comprises bringing a primary amine into reaction with a nitroparaffin having a nitro group attached to a primary carbon atom, in the presence of formaldehyde, the latter being employed in a ratio of at least three moles to one mole of nitroparaffin and one mole of primary amine, and separating and recovering the 5-nitrotetrahydro-1,3-oxazines thus formed.

3. A process for the preparation of 5-nitrotetrahydro-1,3-oxazines, which comprises adding formaldehyde to a primary amine to produce the corresponding N-hydroxymethylamine, and thereafter adding to the resulting mixture a nitroparaffin having the nitro group attached to a primary carbon atom, the formaldehyde being added in a ratio of at least three moles to one mole of nitroparaffin and one mole of primary amine, and separating and recovering the 5-nitrotetrahydro-1,3-oxazines thus formed.

4. A process for the preparation of 5-nitrotetrahydro-1,3-oxazines, which comprises mixing a primary amine with a 2-nitro-1,3-propanediol in a molecular ratio of approximately one mole of said amine to one of 2-nitro-1,3-propanediol in the presence of formaldehyde, the remainder of the formaldehyde required for the preparation of the desired 5-nitrotetrahydro-1,3-oxazines being furnished by the decomposition of said 2-nitro-1,3-propanediol into formaldehyde and a nitroparaffin having the nitro group attached to a primary carbon atom, and separating and recovering the 5-nitrotetrahydro-1,3-oxazines thus formed.

5. A process for the preparation of 5-nitrotetrahydro-1,3-oxazines, which comprises mixing a primary amine with a 2-nitro-1,3-propanediol in a molecular ratio of approximately one mole of said amine to one of said 2-nitro-1,3-propanediol in the presence of at least one mole of formaldehyde, the remainder of the formaldehyde required for the preparation of the desired 5-nitrotetrahydro-1,3-oxazines being furnished by the decomposition of said 2-nitro-1,3-propanediol into formaldehyde and nitroparaffin having the nitro group attached to a primary carbon atom, and separating and recovering the 5-nitrotetrahydro-1,3-oxazines thus formed.

6. The process of claim 3 in which the nitroparaffin is nitroethane and the primary amine is 5-amino-5-methyl-1,3-dioxane.

7. The process of claim 4 in which the 2-nitro-1,3-propanediol is 2-nitro-2-methyl-1,3-propanediol and the primary amine is methylamine.

8. The process of claim 4 in which the 2-nitro-1,3-propanediol is 2-nitro-2-methyl-1,3-propanediol and the primary amine is isopropylamine.

9. As new compositions of matter, 5-nitrotetrahydro-1,3-oxazines.

10. 5-nitro-3,5-dimethyltetrahydro-1,3-oxazine.

11. 5-nitro-3-isopropyl-5-methyltetrahydro-1,3-oxazine.

12. 5-nitro-3-(1-methyl-3,5-dioxacyclohexyl)-5-methyltetrahydro-1,3-oxazine.

MURRAY SENKUS.

REFERENCES CITED

The following references are of record in the file of this patent:

UNITED STATES PATENTS

| Number | Name | Date |
|---|---|---|
| 2,391,847 | Senkus | Dec. 25, 1945 |

Certificate of Correction

Patent No. 2,447,822.

August 24, 1948.

MURRAY SENKUS

It is hereby certified that errors appear in the printed specification of the above numbered patent requiring correction as follows: Column 1, line 34, for "tertahydro" read *tetrahydro*; column 3, line 69, for "methlene" read *methylene*; and that the said Letters Patent should be read with these corrections therein that the same may conform to the record of the case in the Patent Office.

Signed and sealed this 16th day of November, A. D. 1948.

[SEAL]

THOMAS F. MURPHY,
*Assistant Commissioner of Patents.*